(12) United States Patent
Håkansson

(10) Patent No.: US 6,199,822 B1
(45) Date of Patent: Mar. 13, 2001

(54) FLUID-OPERATED ACTUATOR

(75) Inventor: Nils-Olof Håkansson, Stenkullen (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 08/974,533

(22) Filed: Nov. 19, 1997

(30) Foreign Application Priority Data

Nov. 22, 1996 (SE) .................................. 9604287

(51) Int. Cl.⁷ ........................... F16K 31/122; F01B 31/00
(52) U.S. Cl. ........................... 251/58; 91/394; 92/162 R
(58) Field of Search ................... 91/400, 440, 394; 92/162 R, 84, 130 R, 85 R, 143, 172; 60/602; 251/58, 62

(56) References Cited

U.S. PATENT DOCUMENTS

| | | | |
|---|---|---|---|
| 892,194 | * 6/1908 | Stewart et al. | 92/162 R |
| 2,078,106 | * 4/1937 | Temple | 251/58 |
| 3,364,675 | * 1/1968 | Dorer | 92/162 R |
| 3,704,855 | 12/1972 | Combes. | |
| 3,970,280 | * 7/1976 | Kunz | 251/58 |
| 4,005,579 | 2/1977 | Lloyd | 60/602 |
| 4,044,631 | * 8/1977 | Matousek et al. | 92/161 |
| 4,418,536 | 12/1983 | Deutschmann | 60/602 |
| 4,594,939 | 6/1986 | Van Os. | |
| 5,066,186 | * 11/1991 | Shimada et al. | 251/58 |
| 5,675,969 | * 10/1997 | Satoh | 60/324 |

FOREIGN PATENT DOCUMENTS

| | | |
|---|---|---|
| 2621031 A1 | 12/1976 | (DE). |
| 44 32 744 A 1 | 3/1996 | (DE). |
| 954.080 | 12/1949 | (FR). |
| 2.094.366 | 2/1972 | (FR). |
| 2484041 | * 12/1981 | (FR) ..................................... 92/172 |
| 2 500 542 | 8/1982 | (FR). |
| 531883 | 1/1974 | (GB). |
| 408093512 | * 4/1996 | (JP). |
| WO 92/08887 | 5/1992 | (WO). |

* cited by examiner

Primary Examiner—F. Daniel Lopez
(74) Attorney, Agent, or Firm—Lerner, David, Littenberg, Krumholz & Mentlik, LLP

(57) ABSTRACT

A fluid-operated actuator (10) particularly for use in diesel-engined vehicles has a housing (12) defining a cylinder (14) having a cylinder wall (16) extending about a longitudinal axis (18). A piston (20) is arranged for reciprocal motion in the cylinder between a first end position and a second end position and an actuator rod (24) cooperates with the piston. The housing (12) includes first sealing means (28) for establishing a sealing contact with a first region (30) of the piston in the first end position and second sealing means (34) for establishing a sealing contact with a second region (36) of the piston in the second end position to thereby prevent leakage of operating fluid past the piston when the piston is in either of its end positions. To obviate e.g. the need for piston rings, the piston (20) and the housing (12) are arranged such that when the piston is between the first end position and the second end position, operating fluid is permitted to leak between the piston and cylinder wall (16).

12 Claims, 3 Drawing Sheets

FLUID-OPERATED ACTUATOR

TECHNICAL FIELD

The present invention relates to a fluid-operated actuator in which a piston is arranged for reciprocal motion in a cylinder between two end positions.

BACKGROUND OF THE INVENTION

The need for hydraulic or compressed air-operated actuators exists in many technical areas. Traditional actuators have a piston arranged for reciprocal motion within a cylinder, with the piston cooperating with an actuator rod connected to a component, the relative position of which is to be changed. Typically, the piston is provided with at least one piston ring to ensure no leakage of the operating fluid past the piston. In many applications, the piston rings are made of a soft, elastic material such as rubber or a plastics material. In working environments in which an actuator may be subjected to high temperatures, however, it is not possible to use materials having a low melting point. In such cases it has hitherto been necessary to employ piston rings made of, for example, spring steel.

Nevertheless, even spring steel has limitations as regards temperatures to which it may be subjected. For example, unless special precautions are taken, it is not possible to use such an actuator in the vicinity of the exhaust manifold of an internal combustion engine.

SUMMARY OF THE INVENTION

It is therefore an object of the present invention to provide a fluid-operated actuator suitable for use in harsh environments, which actuator is simpler than traditional actuators.

This object is achieved by a fluid-operated actuator comprising:

- a housing defining a cylinder having a cylinder wall extending about a longitudinal axis;
- a piston arranged for reciprocal motion in said cylinder along said longitudinal axis between a first end position and a second end position;
- an actuator rod cooperating with said piston for displacement substantially along said longitudinal axis, and
- first sealing means in said housing for establishing a sealing contact with a first region of said piston in said first end position and second sealing means in said housing for establishing a sealing contact with a second region of said piston in said second end position to thereby prevent leakage of operating fluid past said piston when said piston is in said first end position and said second end position;

wherein said piston and said housing are arranged such that when said piston is between said first end position and said second end position, operating fluid is permitted to leak between said piston and said cylinder wall.

The present invention is based on the insight that many actuators are required only to effect displacement of a component between two predetermined end positions. A typical application of such an actuator is for operating an on/off valve, i.e. the valve is either fully open or fully closed. With such valves, movement of the piston between the two end positions takes place very rapidly. As such, the need for high quality sealing exists only in the end positions because any leakage which takes place during the displacement of the piston will be low in volume due to the short time which the piston takes to travel from one end position to the other.

In a preferred embodiment of the invention, the actuator rod cooperates with the piston via a flexible coupling, the flexible coupling being arranged to permit axial displacement of the actuator rod relative the piston. In this manner, sealing relationship is ensured even if the actuator rod be subjected to vibrations.

BRIEF DESCRIPTION OF THE DRAWINGS

The present invention will be described in the following in greater detail by way of example only and with reference to the attached drawings in which.

DETAILED DESCRIPTION OF PREFERRED EMBODIMENTS

Figure 1:
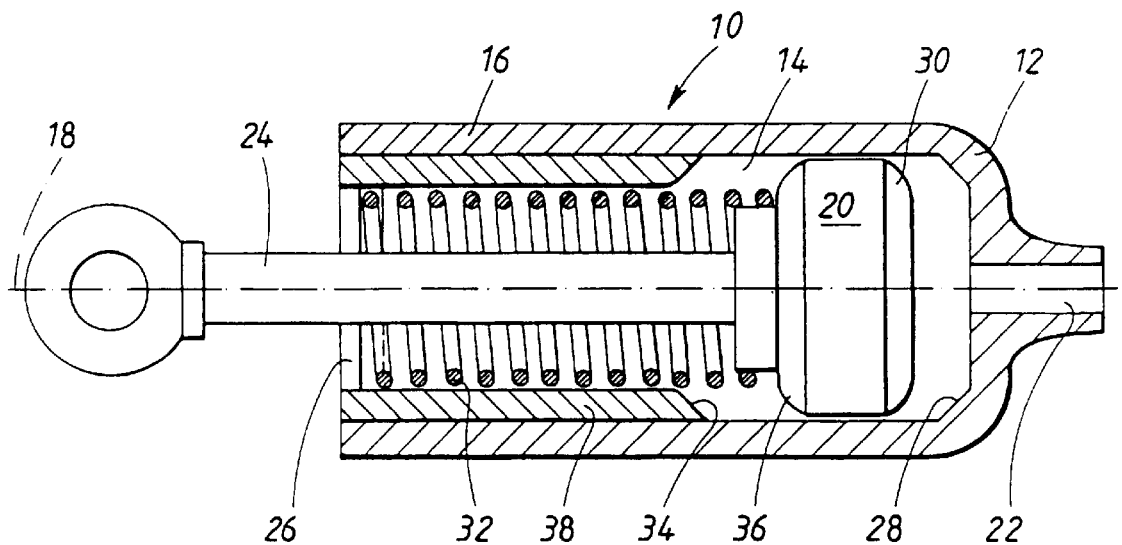
FIG. 1 is a simplified schematic cross-sectional view through a fluid-operated actuator according to the present invention.

In the drawings, reference numeral 10 generally denotes a fluid-operated actuator in accordance with the present invention. The actuator 10 comprises a housing 12 defining a cylinder 14 having a cylinder wall 16 extending about a longitudinal axis 18. A piston 20 is arranged for reciprocal motion in the cylinder along the longitudinal axis 18. The piston 20 is arranged to be driven by an operating fluid, for example compressed air, which is introduced into the cylinder 14 via an inlet 22 disposed in the housing 12, preferably at one axial end thereof. Introduction of the operating fluid causes the piston 20 to be displaced from a first end position at which the piston lies adjacent the inlet 22 to a second end position remote from the inlet.

In order to translate displacement of the piston into useful work, the piston 20 cooperates with an actuator rod 24. The actuator rod extends substantially along the longitudinal axis 18 and out through an opening 26 in the housing at an end opposite to that of the fluid inlet 22. In a manner which will be explained later, the extension of the actuator rod may deviate by a few degrees with respect to the axis 18. Nevertheless, the actuator rod 24 is arranged to be displaced by the piston 20 substantially along the longitudinal axis 18.

First sealing means 28 are provided in the housing 12 for establishing a sealing contact with a first region 30 of the piston 20 when the piston is in its first end position. The first sealing means 28 is advantageously a seat valve formed in the cylinder wall 16 of the housing at the end of the housing adjacent the inlet 22. Unless acted upon by operating fluid, the piston 20 resides in the first end position due to the biasing action of spring means, for example a helical spring 32, acting on the piston within the housing.

Second sealing means 34 are also provided in the housing 12, with this second means serving to establish a sealing contact with a second region 36 of the piston 20 when the piston is in the second end position. As is apparent from the drawings, the second region 36 of the piston is axially opposite to its first region 30. The second sealing means 34 is advantageously incorporated in an axial end of a generally cylindrically shaped insert 38 in the housing 12. As is most clearly apparent from FIG. 2, the insert 38 may either be screwed into the housing or may be a press fit therein. The axial end of the insert 38 forms a seat valve 34 against which the second region 36 of the piston 20 abuts when the piston is in its second end position, i.e. when the operating fluid has displaced the piston from its first end position.

Figure 2:
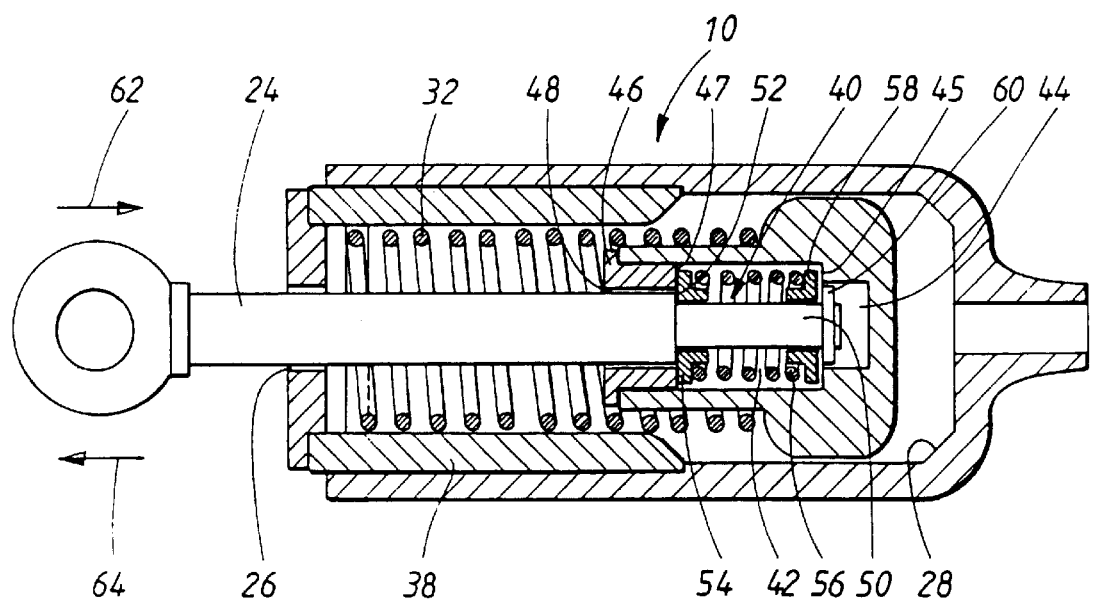
FIG. 2 is a schematic cross-sectional view through a second embodiment of an actuator according to the present invention.

The first and second sealing means 28, 34 serve to prevent leakage of operating fluid past the piston 20 when the piston is in the first end position and the second end position respectively. However, and in accordance with the present invention, the piston 20 and the housing 12 are arranged such that when the piston is between the first end position and the second end position, operating fluid is permitted to leak between the piston and the cylinder wall 16. This position of the piston is shown in FIGS. 1 and 2. Due to the rapid displacement of the piston between its end positions, leakage will normally occur for only a fraction of a second.

Rather than being regarded as wasteful and undesirable, the rush of operating fluid past the piston serves to cool the piston and housing, as well as blowing away any dirt which may have accumulated on the valve seats 28, 34. The cooling aspect of this leakage is particularly beneficial for the contemplated use of the present invention in diesel engines where, especially in the vicinity of the exhaust manifold, high temperatures prevail.

Figure 4:
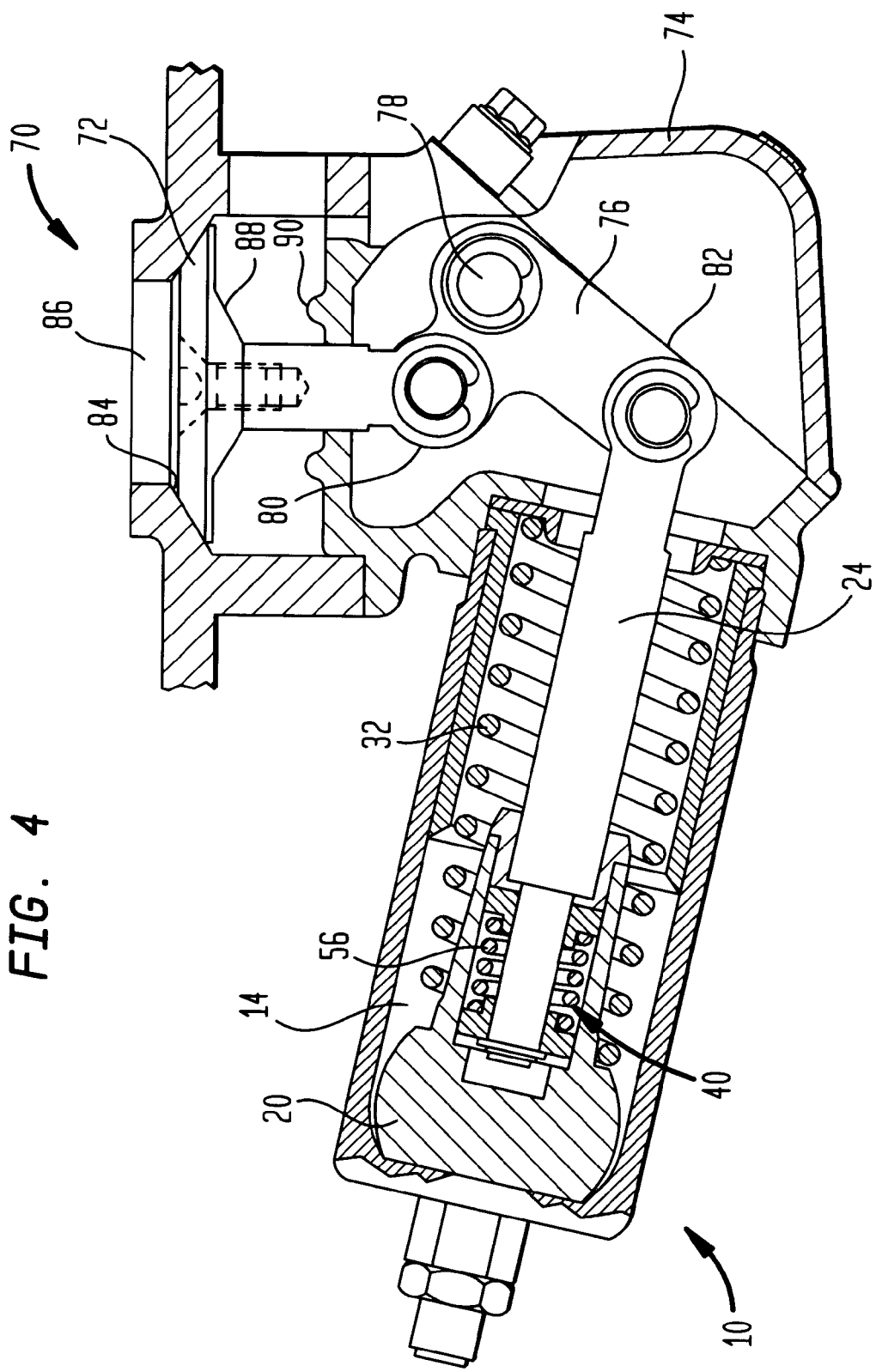
FIG. 4 is a schematic cross-sectional view through an installation incorporating an actuator of the present invention having a substantially spherical piston.

In a preferred embodiment of the invention, and as shown in the drawings, the first and second regions 30, 36 of the piston 20 have a convex or rounded shape. This arrangement ensures that adequate sealing is attained in the end positions, even if the piston is slightly misaligned. This may occur, for example, if the actuator rod 24 is caused to effect a displacement which is not concentric with the longitudinal axis 18. In an embodiment of the invention shown in FIG. 4, the piston may even be substantially spherical.

Common to all shapes of the piston 20 is that the piston may have an uninterrupted axially and circumferentially extending surface facing the cylinder wall 16, i.e. no piston rings need be present.

Figure 3:
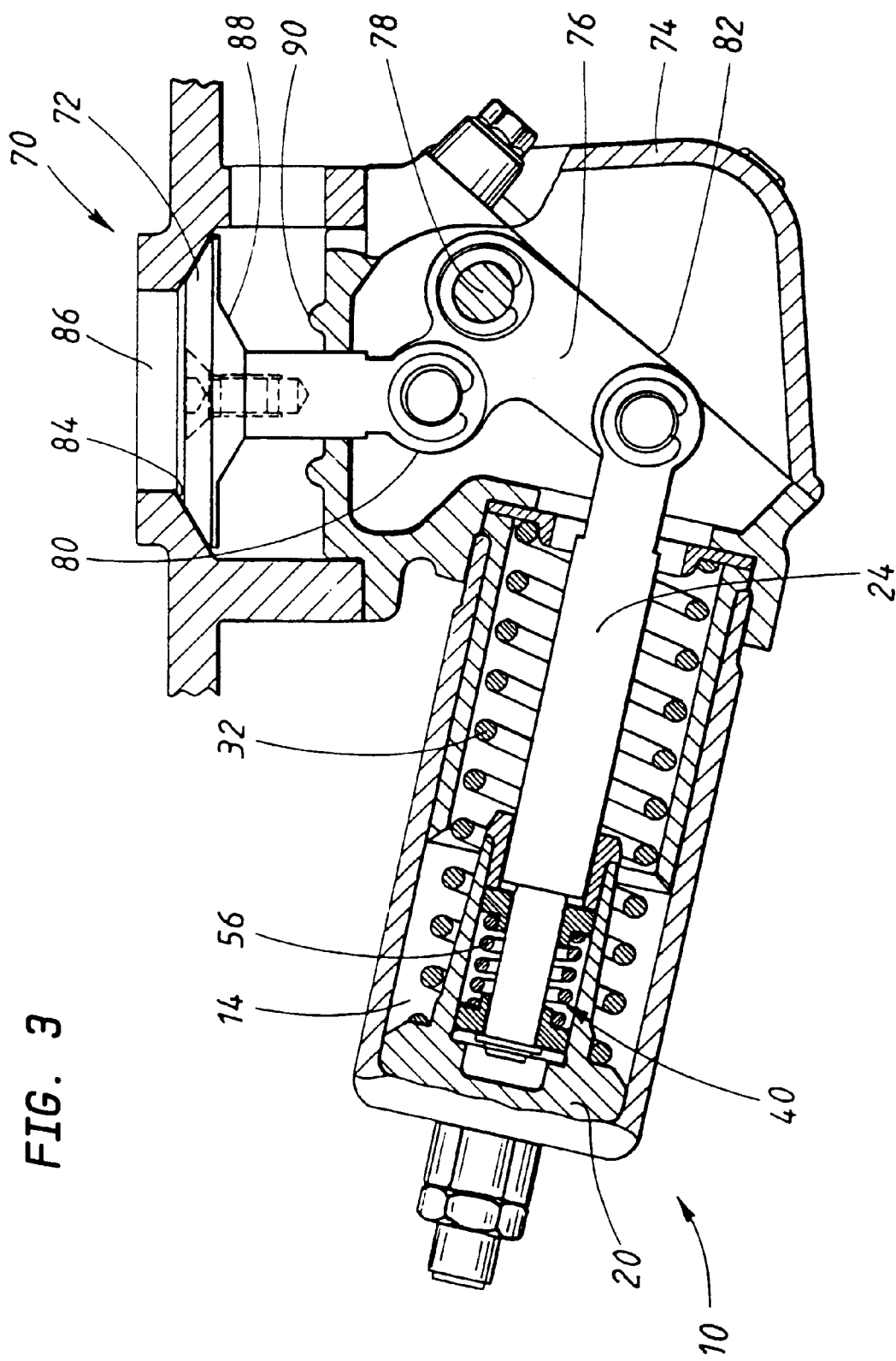
FIG. 3 is a schematic cross-sectional view through an installation incorporating an actuator of the present invention.

The convex or rounded shape of the first and second regions 30, 36 of the piston also assists in maintaining sealing contact with the first and second sealing means 28, 34 respectively should the actuator be subjected to vibrations. For applications in which considerable vibrations may arise, and in accordance with a preferred embodiment of the present invention as shown in FIGS. 2 and 3, the actuator rod 24 cooperates with the piston 20 via a flexible coupling, generally denoted by reference numeral 40. The flexible coupling 40 is arranged to permit axial displacement of the actuator rod 24 relative the piston 20.

Thus, the flexible coupling 40 is preferably housed in an axially extending opening in the piston 20, the opening consisting of a first chamber 42 and a second chamber 44, with the first chamber having a diameter greater than the second chamber. In this manner, a shoulder 45 is formed in the piston at the transition between the first and second chambers. The opening is closed by a collar 46 which may be screwed or press fitted into the opening of the piston 20. In its inserted position, the collar 46 presents an end surface 47 facing into the first chamber 42. The collar 46 has an axially extending through bore 48 along which the actuator rod 24 may slide. Within the opening, the actuator rod 24 has a reduced diameter section 50, for example 60% of the diameter of the rest of the actuator rod. Thus, an abutment shoulder 52 is formed on the actuator rod within the opening. A first sliding collar 54 is arranged on the reduced diameter section 50 of the actuator rod and is biased towards the abutment shoulder 52 of the rod and the end surface 47 of the collar 46 by a spring 56, for example a helical spring. The spring force generated by the spring 56 of the flexible coupling is less than that generated by the spring 32 acting on the piston 20. The spring 56 of the flexible coupling also acts on a second sliding collar 58 arranged on the reduced diameter section 50. The spring biases the second sliding collar 58 towards the shoulder 45 in the piston and a locking ring 60 disposed in the vicinity of the free axial end of the reduced diameter section 50. The diameter of the second chamber 44 is such that it allows the locking ring 60 to pass therein.

The functioning of the flexible coupling will now be described.

With the piston 20 in its first end position, i.e. with the first region 30 of the piston in sealing relationship with the first sealing means 28, a displacement of the actuator rod 24 in a direction indicated by arrow 62 will result in the abutment shoulder 52 of the rod acting on the first sliding collar 54 compressing the spring 56 of the flexible coupling. Since the second sliding collar 58 is prevented from being moved in the direction of the arrow 62 by the shoulder 45 formed in the piston, a portion of the reduced diameter section 50 of the actuator rod will be compelled to slide through the second sliding collar such that the locking ring 60 on the actuator rod is displaced within the second chamber 44.

This sequence of events also applies for the case in which the piston 20 is maintained in its second end position by pressure prevailing in the cylinder 14. Thus, sealing relationship will be maintained between the second region 36 of the piston and the second sealing means 34 provided that the actuator is displaced in the direction of the arrow 62 in FIG. 2 with a force which can be accommodated by the spring 56 of the flexible coupling without exceeding the force generated on the piston by the operating fluid in the cylinder 14.

With the piston 20 in its first end position, should the actuator rod 24 be displaced in a direction indicated by the arrow 64 in FIG. 2, the locking ring 60 on the actuator rod will act on the second sliding collar 58, causing the spring 56 of the flexible coupling to become compressed. The piston will be retained in its first end position, and therefore in sealing relationship with the first sealing means 28, by the force applied by the spring 32 in the housing 12 unless the actuator is displaced in the direction of arrow 64 with a force with exceeds that generated by the spring 32 at the same time that the displacement is greater than the compressible length of the spring 56 in the flexible coupling.

From the above, it will be apparent that the provision of the flexible coupling 40 ensures that sealing relationship will be maintained at either end position even if the actuator rod be subjected to vibrations or even if the actuator rod be subjected to other displacements which are shorter in amplitude than the compressible length of the spring 56 in the flexible coupling. This latter condition will be explained in further detail with reference to the embodiment shown in FIG. 3.

Thus, in FIG. 3, an embodiment of an actuator 10 according to the present invention is depicted for use with a valve arrangement generally denoted by reference numeral 70. The valve arrangement 70 comprises a valve closure member 72 projecting through an opening in a valve housing 74. A pivot link 76 is journalled for pivotal displacement within the valve housing 74 about an axis 78. The pivot link is in the form of a substantially L-shaped lever having a first 80 and a second 82 free end, with the axis 78 located therebetween. A portion of the valve closure member 72 projecting into the valve housing 74 is journalled to the first free end 80 of the pivot link 76.

The actuator 10 cooperates with the valve housing 74 such that the end of the actuator rod 24 exterior of the actuator housing 12 projects into the valve housing 74 and is journalled to the second free end 82 of the pivot link 76. The actuator is shown in FIG. 3 with the piston 20 in its first end position and the valve closure member 72 of the valve arrangement 70 in a position fully extended from the valve housing 74 at which the valve closure member 72 is sealingly held against a valve seat 84 formed in a passage 86 which is to be closed.

The components of the actuator shown in FIG. 3 may be made from any suitable material. Generally, however, stainless steel is preferred. Typically, the diameter of the piston may be about 50 mm and the length of the cylinder about 110 mm.

Introduction of operating fluid into the actuator 10 will cause the piston 20 to be displaced towards the valve housing 74. Initial displacement of the piston 20 will cause the spring 56 of the flexible coupling to compress and thereafter initiate displacement of the actuator rod 24. Displacement of the actuator rod 24 will cause the pivot link 76 in the valve housing 74 to pivot about the pivot axis 78, thereby drawing the valve closure member 72 towards the valve housing 74.

Due to the fact that the pivot axis 78 is fixed, rotation of the pivot link 76 about the axis implies that the actuator rod 24 will not follow a truly straight line during displacement of the piston 20 from its first end position to its second end position. In other words, the actuator rod will not follow exactly the longitudinal axis 18 of the cylinder 14. However, since the actuator according to the invention is designed to permit leakage between the piston and the cylinder wall during displacement of the piston between its end positions, the relatively large radial clearance between the piston and cylinder wall is sufficient to permit deviation of the actuator rod from the longitudinal axis 18. It will be apparent that if the piston 20 should be rounded along its axial extension in the vicinity of the cylinder wall 16, then deviation of the actuator rod from the longitudinal axis will be possible even with a very small radial clearance between the piston and the cylinder wall.

The valve closure member 72 is drawn towards the valve housing 74 until a seat 88 on the valve closure member 72 contacts a stop seat 90 on the valve housing 74. Due to the provision of the flexible coupling 40, the valve closure member may contact the stop seat 90 before the piston 20 reaches its second end position, provided that the remaining travel of the piston can be accommodated by the spring 56 of the flexible coupling. This implies that the stroke length of the actuator need not exactly match the stroke length of the valve arrangement, thereby allowing flexibility in matching actuators to valve arrangements in industrial applications.

When it is desired to return the valve closure member 72 to the position shown in FIG. 3 in which the valve closure member abuts the valve seat 84, the pressure of the operating fluid in the cylinder 14 is reduced such that the pressure exerted by the spring 32 in the housing on the piston 20 exceeds that of the operating fluid. The piston is thereby displaced from its second end position to its first end position and the actuator rod 24 consequently effects pivotal displacement of the pivot link 76. Again, the valve closure member 72 may contact the valve seat 84 before the piston 20 has reached its first end position, provided that the remaining travel of the piston can be accommodated by the spring 56 of the flexible coupling.

Naturally, the invention is not restricted to the embodiments described above and shown in the drawings, but may be varied within the scope of the appended claims. For example, in certain embodiments the piston may be provided with guiding rings which nevertheless allow operating fluid to leak between the piston and the cylinder wall.

What is claimed is:

1. A valve assembly, comprising a housing defining a cylinder having a cylinder wall extending about a longitudinal axis, said cylinder having a selected diameter;

a piston arranged for reciprocal motion in said cylinder along said longitudinal axis between a first end position and a second end position, said piston having a size in cross-section which is less than said selected diameter so as to define a clearance between said piston and said cylindrical wall;

an actuator rod cooperating with said piston for displacement along a substantially longitudinal path relative to said housing, wherein said clearance allows at least a portion of said path to deviate from said longitudinal axis;

a first surface in said housing for establishing sealing contact with a first region of said piston in said first end position and a second surface in said housing for establishing sealing contact with a second region of said piston in said second end position to thereby prevent leakage of operating fluid past said piston when said piston is in said first end position and said second end position, wherein said piston and said housing are arranged such that, when said piston is between said first end position and said second end position, operating fluid is permitted to leak through said clearance; and a valve mechanism operatively connected via a pivot link to said actuator rod for movement between an open condition and a closed condition in response to said displacement of said actuator rod along said substantially longitudinal path.

2. The valve assembly as claimed in claim 1, further comprising a spring assembled in said housing to bias said piston towards said first end position.

3. The valve assembly as claimed in claim 1, wherein said first and second surfaces in said housing each comprise a seat valve.

4. The valve assembly as claimed in claim 1, wherein said first and second regions of said piston each have a convex shape.

5. The valve assembly as claimed in claim 4, wherein said first and second regions of said piston have a substantially spherical surface.

6. The valve assembly as claimed in claim 1, wherein said piston has an uninterrupted axially and circumferentially extending surface facing said cylinder wall.

7. The valve assembly as claimed in claim 1, further comprising a flexible coupling operatively connected between said piston and said actuator rod, said flexible coupling being arranged to permit axial displacement of said actuator rod relative to said piston.

8. The valve assembly as claimed in claim 7, wherein said flexible coupling is housed within said piston.

9. The valve assembly as claimed in claim 7, wherein said flexible coupling comprises a helical spring.

10. The valve assembly as claimed in claim 1, wherein said valve mechanism includes a valve housing and an operating element movable relative to said valve housing, said pivot link being mounted in said valve housing for pivotal movement about a pivot point and being connected at a first connection point to said actuator rod and at a second connection point to said operating element, said pivot point being positioned between said first and second connection points.

11. The valve assembly as claimed in claim 10, wherein said pivot link is in the form of a substantially L-shaped lever.

12. A valve assembly as claimed in claim 1, wherein said pivot link is in the form of a substantially L-shaped lever.

* * * * *